United States Patent [19]

Handa et al.

[11] Patent Number: 4,994,655
[45] Date of Patent: Feb. 19, 1991

[54] ELECTRO-FUSION JOINT

[75] Inventors: Takayuki Handa, Iwakuni; Naotake Uda, Yamaguchi, both of Japan

[73] Assignee: Mitsui Petrochemical Industries, Ltd., Tokyo, Japan

[21] Appl. No.: 363,883

[22] PCT Filed: Oct. 21, 1988

[86] PCT No.: PCT/JP88/01077
§ 371 Date: Jun. 8, 1989
§ 102(e) Date: Jun. 8, 1989

[87] PCT Pub. No.: WO89/03955
PCT Pub. Date: May 5, 1989

[30] Foreign Application Priority Data

Oct. 22, 1987 [JP] Japan ................................ 62-162069

[51] Int. Cl.$^5$ .............................................. H05B 3/48
[52] U.S. Cl. .................................... 219/535; 219/487
[58] Field of Search ............... 219/487, 489, 535, 544; 156/64, 157, 158, 304.2, 304.6

[56] References Cited

U.S. PATENT DOCUMENTS

| | | | |
|---|---|---|---|
| 4,117,311 | 9/1978 | Sturm | 219/535 |
| 4,486,650 | 12/1984 | Bridgstock | 219/535 |
| 4,684,417 | 8/1987 | Grandclement | 219/535 |
| 4,703,150 | 10/1987 | Kunnecke | 219/535 |
| 4,727,242 | 2/1988 | Barfield | 219/535 |

FOREIGN PATENT DOCUMENTS 0151340  11/1984  European Pat. Off. .
2119744   5/1982  United Kingdom .
2137026   9/1984  United Kingdom .

Primary Examiner—Roy N. Envall, Jr.
Attorney, Agent, or Firm—Sherman and Shalloway

[57] ABSTRACT

This invention relates to an electrofusion joint, in which the electric power is supplied to a heating wire, which is buried in a resin, to melt the resin and thereby connect pipes together, and more particularly to an electrofusion joint, in which a member to be connected to a sensor-carrying connector is molded unitarily with the joint with a code member, which is to be detected by the sensor, molded unitarily with the member to be connected. A code displayed on the code member is read by the sensor and judged by a control unit as the quantity of power supplied to the heating wire through the connector and the member to be connected, or as the time during which the electric current is thus supplied to the heating wire, whereby an electric power of a predetermined magnitude is supplied thereto.

5 Claims, 2 Drawing Sheets

ELECTRO-FUSION JOINT

FIELD OF THE INVENTION

The present invention relates to an electro-fusion joint which is used in connecting pipes made of a plastic material and, more particularly, to an electro-fusion joint in the form of a socket-type pipe joint or a saddle-type joint with an electric heat-generating wire embedded under the surface thereof contactable with surfaces of the pipes to be connected.

BACKGROUND ART

Electro-fusion joints have been developed recently for use as pipe joints and saddle joints for the purpose of connecting plastic pipes such as running water service pipes and gas pipes.

In general, an electro-fusion joint is a molded part having a coil embedded therein. In use, pipes to be connected together are inserted into both ends of the joint and electric power is supplied to the coil so that the surfaces of the joint and the surfaces of the pipe contacting each other are heated and fused together whereby the pipes are connected to each other by means of the joint.

The electrical power supplied to the joint largely affects the quality of the joint. For instance, a too large electrical power supplied to the joint tends to cause a deformation of the joint portion, particularly the plastic pipes. Conversely, a too small electrical power produces only small amount of heat, with the result that the bonding strength is lowered undesirably. The device for supplying electrical power to the joint is usually controlled manually. Namely, the operator increases or decreases the amount of electrical power upon judging the state of fusion from the appearance of the joint.

Since the control of the electrical power is conducted manually, the quality of the connection largely depends on the degree of skill and experience of the operator, so that the quality tends to fluctuate undesirably.

Under this circumstance, a method has been proposed and used in recent years in which a plurality of levels of electrical power are beforehand set corresponding to sizes and types of the electro-fusion joints and the operator selects one of these set levels after visual recognition of the size and the type of the joint which is to be used, so that the connection is conducted with the electrical power of the set level.

A method also has been proposed in which an identification resistance of a value corresponding to the type of the joint is embedded in the pipe joint in addition to the heat-generating coil for fusing the joint such that the type of the joint can be identified through detection of the resistance. Then, the connecting operation is conducted by supplying electrical power which has been set in relation to the level of the identification resistance.

In a similar method which also has been proposed, the type of the joint is identified through measurement of the resistance value of the heat-generating coil in the joint, and the electrical power which has been set in correspondence with the joint type is supplied.

The selection of the set levels of the electrical power upon visual recognition of the joint size and type requires a laborious work for checking up the data showing the relationship between the size and type of the joint and the level of the electrical power.

The method which identifies the type of the joint through measurement of the resistance of the heat-generating wire enables the user to identify the type of the joint simply by inserting a plug, jack or a connector on the end of a cord and the electrical power of the level corresponding to the identified joint type is automatically supplied.

However, the method which relies upon the recognition of the joint type through detection of the identification resistance separate from the heat-generating wire also is disadvantageous in that the construction is complicated to raise the cost of the joint.

This problem is overcome by the method which makes use of detection of the resistance value of the embedded heat-generating wire. In this method, however, the freedom of design of the joint is undesirably restricted because the heat-generating wire is required to have the function for identifying the type of the joint.

Namely, the resistance value varies depending on the resin material of the resin. In addition, designing of heat-generating wires for optimizing heating conditions for various sizes and types of joint may cause overlapping of resistance value of the heat-generating wire over different sizes and types of joint. Conversely, if the design is made while giving a priority to the identification function, the optimum heating condition may not be attained.

DISCLOSURE OF THE INVENTION

An object of the present invention is to provide an electro-fusion joint which enables an accurate and easy recognition of the joint without restricting the degree of freedom of the design of the pipe joint.

To this end, according to the present invention, there is provided an electro-fusion joint in which a mating connector to be connected to a connector having a sensor is formed on the joint integrally therewith, and a coding portion to be sensed by the sensor on the coupling is formed integrally on the mating connector.

The sensor is capable of reading a code on the coding portion and a controller determines, in accordance with the read code, the amount or the time length of supply of the electrical power which is to be supplied through the connector and the mating connector, thereby enabling the joint to be supplied with a predetermined amount of electrical power.

BRIEF DESCRIPTION OF THE DRAWINGS

FIGS. 1 to 4 show embodiments of the present invention in which:

FIG. 1 is a partially sectioned and partially exploded view of an electro-fusion joint with the pipe joint 1 in partial section and plugs 6 juxtaposed adjacent corresponding mating connectors 2 on the pipe joint 1;

FIG. 2 is a sectional view of an essential portion;

FIG. 3 is a perspective view showing an arrangement incorporating a photo-interrupter; and FIG. 4 is a block diagram.

THE BEST MODE FOR CARRYING OUT THE INVENTION

Figure 1:
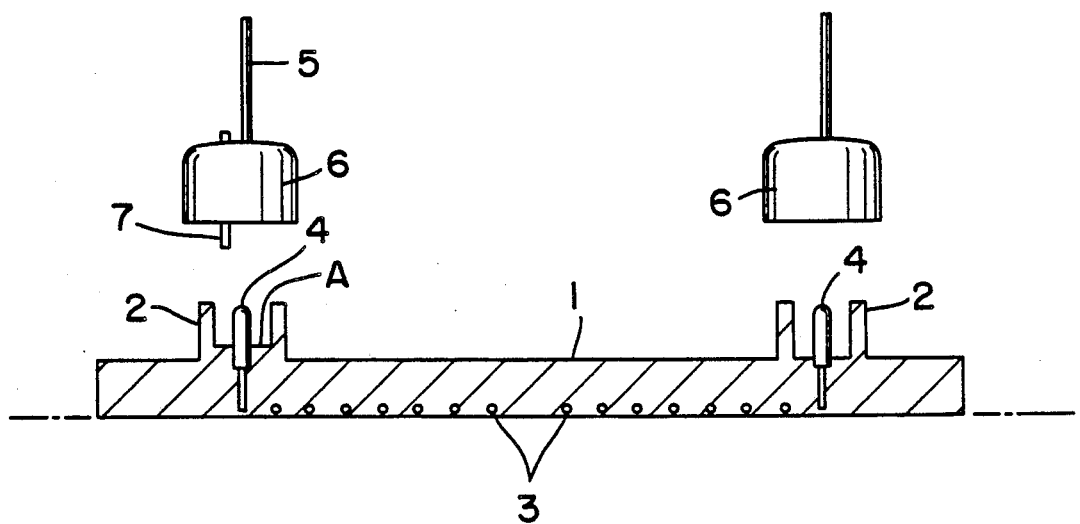

The term "electro-fusion joint" is used in the case of this invention to generally means socket-type joints and saddle-type joints.

The mating connector which is to be connected to the connector having the sensor may have various forms which can be disconnectably coupled to the connector having sensor, such as plugs, sockets, jacks, receptacles, and various other forms of couplers and connectors.

Considering that the coding portion is formed integrally with the mating connector, the coding portion is preferably designed to give the identification code by at least one of height, depth, wall-thickness, inside diameter, outside diameter and combination of convexity and concavity.

In the electro-fusion joint of the present invention, it is significant that the coding portion is constructed in such a manner as to provide at least one of the level of the electrical power supplied to the heat-generating wire through the connector and the mating connector and the time length of supply of the electrical power. Since the amount of the electrical power is the product of the level of the electrical power supplied per unit time and the length of time through which the electrical power is supplied, the code may be designed such as to show the electrical power amount itself or both the electrical power level and the time length of supply of the electrical power. If the electrical power supply system is designed to provide the electrical power of a constant level, the coding portion may code only the time length of supply of the electrical power so that only the time length is read as the data to enable the joint to be supplied with the required amount of electrical power.

The coding portion may be formed only on a portion of the mating connector. Preferably, however, the coding portion is formed over the entire circumference of the mating connector so as to enable the sensor to identify the joint type regardless of the rotational posture of the connector such as a plug or a jack inserted into the mating connector.

When the coding portion is realized by a combination of convexity and concavity, it is preferred that convexities and concavities are formed on the inner surface of the mating connector such as to extend in the axial direction of the mating connector, with the numbers, breadth and depth of these convexity and concavity varied in accordance with different types of the joint.

Sensors of various types are usable as the sensor on the connector. For instance, it is possible to use a position sensor which is capable of reading amount of displacement of contact surface which is caused when a connector such as a plug or a jack is inserted into the mating connector. It is also possible to use a sensor which emits light or sonic wave and reads the length of time till the reflected light or sonic wave is received. A photo-interrupter composed of a light-emitting portion and a light-receiving portion can also be used as the sensor. When a photo-interrupter is used, the arrangement may be such that the light in the photo-interrupter is interrupted by a protrusion of the coding portion and is passed by a recess in the coding portion so that a binary-code is obtained.

In use, a plug, a jack or other type of connector is inserted into the mating connector so that the sensor detects, from the coding portion, data such as the size and type of the joint or the time length of supply of the electrical power or the level of the electrical power to be supplied. The detected data is delivered to the controller for controlling the amount of electrical power to be supplied so that the required amount of electrical power corresponding to the detected data is supplied to the joint.

Data concerning the amounts of electrical power in relation to various sizes and types of the joint are stored in a memory means of the controller so that the optimum electrical power amount is selected in accordance with the result of identification of the size and type of the joint performed by the sensor. Such selection means for selecting the amount of electrical power is not necessary when the coding portion is designed to code the electrical power amount itself. The coding of the electrical power amount may be composed of independent codes for the electrical power level and the time of supply of the electrical power.

A preferred embodiment of the present invention will be described hereinafter.

FIG. 1 shows a pipe joint generally denoted by 1. A mating connector 2 is formed integrally with the pipe joint 1 on each axial end portion thereof. Each mating connector 2 has a receptacle opening into which is projected each terminal 4 of heat-generating wire 3 which is coiled along the inner periphery of the pipe joint. The mating connector 2 is designed to have a specific depth which provides data concerning the size or the type of the pipe joint 1 or the time length or level of the electrical power to be supplied to the pipe joint 1.

Figure 2:
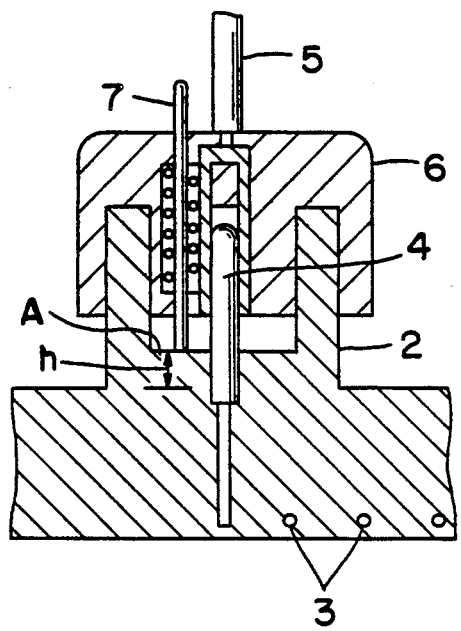

Cords 5 are connected at their one ends to a power supply P via a power controller C. Plugs 6 are connected to the other ends of these cords 5. As shown in FIG. 2, one of the plugs 6 is provided with a known position sensor 7 which is capable of detecting the depth of the mating connector 2.

When the plug 6 is inserted into the mating connector 2, the position sensor 7 abuts the bottom of the mating connector 2 so that it is retracted as the plug is inserted further so that the depth of the mating connector is detected through detection of the amount h of retraction, and the result of this detection is input to the controller C. The controller C identifies the size or type of the joint or the time length of supply of the electrical power or the level of the electrical power, so that the amount of the electrical power to be supplied to the joint is determined, whereby the electrical power is supplied through the terminals 4 from the power supply at the designated level for the designated time length.

Though the described embodiment is arranged to enable the identification of the pipe joint 1 through detection of the depth of the mating connector 2, this is not exclusive and, in another embodiment of the invention, the identification may be conducted through detection of a projection, preferably an annular projection, formed on the inner peripheral surface, outer peripheral surface or the bottom surface of the mating connector 2. In still another embodiment, the identification of the pipe joint is conducted by detecting the overall height, wall-thickness, inside diameter or the outside diameter of the mating connector.

Figure 3:
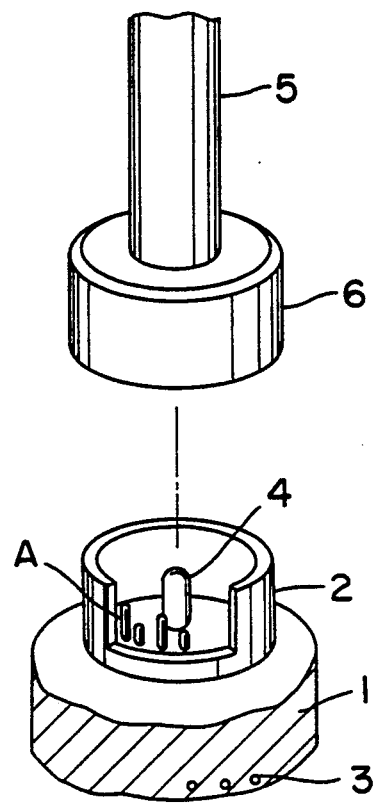
Figure 4:
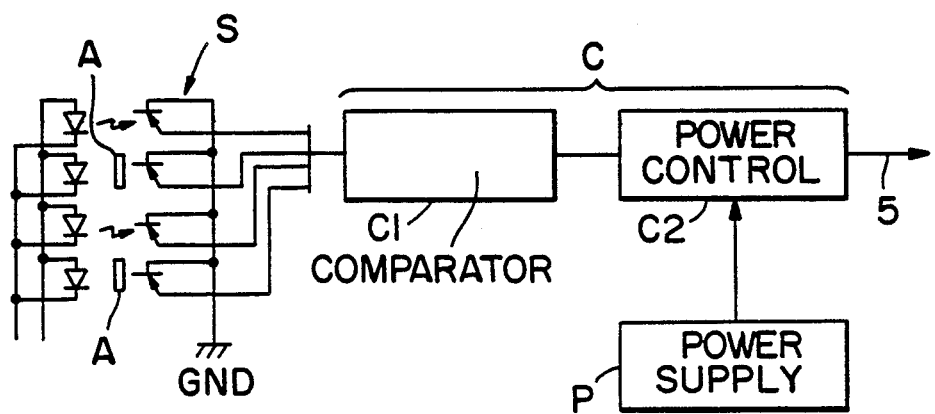

A different embodiment of the invention will be described with reference to FIGS. 3 and 4. This embodiment makes use of a photo-sensor in combination with the coding portion A composed of four projections which are arranged to provide coded 4-bit information concerning the amount of the electrical power. The photo-sensor has a photo-interrupter which is composed of light-emitting diodes and corresponding photo-diodes. In operation, four photo-transistors provide a binary code consisting of high and low level outputs depending on the construction of the coding portion A which is positioned between the light-emitting diodes and the photo-transistors.

The outputs from the photo-transistors are compared in comparator C1, with a predetermined table of sensor outputs vs. electrical power outputs, so that the amount of the electrical power to be supplied is determined, and the power control means C2 operates to control the amount of electrical power in accordance with the thus determined value.

As has been described, in the electro-fusion joint of the present invention, a sensor identifies the type of the joint or picks up data concerning the time length of the supply of electrical power or the amount of the electrical power to be supplied, as the connector such as a plug, jack or other suitable type of connector carrying the sensor is connected to the mating connector on the joint, so that the electrical power is supplied in an amount which is determined optimumly for each joint, whereby the pipe connecting operation at the site can be greatly facilitated.

The provision of the coding portion A does not raise the production cost because the coding portion A can be formed simultaneously with the formation of the joint. Since the coding portion A can easily be formed by an integral molding, the freedom of design is not restricted.

The coding by the coding portion can be realized by at least one of height, depth, wall-thickness, inside diameter, outside diameter and a combination of convexity and concavity so that various coding of data is possible by suitably varying these dimensions and forms.

What is claimed is:

1. An electro-fusion joint for use with electrical control means for controlling the electrical power supplied to the joint from an electric power supply, said electro-fusion joint comprising a joint body having an electric heating element disposed therein; and a mating connector, electrically connected to said heating element, formed integrally with said joint body, said mating connector being integrally provided with a coding portion, said coding portion being configured to provide predetermined information usable by said electrical control means for controlling the electrical power supplied to said joint said mating connector being connectable to a connector provided with a sensor for detecting said configuration of said coding portion, said connector being electrically connected to said electric power supply, said sensor being operatively connected to said electrical control means and providing a signal representative of said predetermined information to said electrical control means, upon connection of said mating connector and said connector and detection of said configuration of said coding portion by said sensor.

2. An electro-fusion joint according to claim 1, wherein said coding portion comprises at least one of a height, depth, wall-thickness, inside diameter, outside diameter, and a combination of convexity and concavity of said mating connector.

3. An electro-fusion joint according to claim 1, wherein said mating connector is releasably connectable to said connector and said mating connector includes one of a plug, a socket, a jack, a receptacle, a coupler and a connector.

4. An electro-fusion joint according to one of claims 1 to 3, wherein said coding portion is capable of showing at least one of information concerning the amount of electrical power to be supplied through said connector and said mating connector and the length of time of the supply of the electrical power.

5. An electro-fusion joint comprising a joint body and a mating connector formed integrally with said joint body and adapted to be connected to a connector provided with a sensor, said mating connector being integrally provided with a coding portion which is capable of being detected by said sensor, said coding portion presenting a code which is to be read by said sensor so as to enable a controller to determine the amount of the electrical power to be supplied through said connector and said mating connector or the time length of supply of said electrical power, whereby a predetermined amount of electrical power is supplied to said joint.

* * * * *